United States Patent

Monson

[15] 3,650,202
[45] Mar. 21, 1972

[54] PORTABLE TOASTER

[72] Inventor: Veldon A. Monson, Box 128, Hammond, Wis. 54015

[22] Filed: Aug. 13, 1969

[21] Appl. No.: 849,763

[52] U.S. Cl. .................................................. 99/391, 320/2
[51] Int. Cl. ........................................................... A47j 37/08
[58] Field of Search .................... 99/391, 385, 386, 389, 390, 99/393, 400; 320/2; 15/DIG. 1; 219/205, 208, 386, 433, 439, 441, 528

[56] References Cited

UNITED STATES PATENTS

| | | | |
|---|---|---|---|
| 3,079,486 | 2/1963 | Winchell | 219/528 |
| 3,105,138 | 9/1963 | Gazdik | 219/433 X |
| 1,538,992 | 5/1925 | Hopkins | 320/2 UX |
| 3,277,271 | 10/1966 | Hunt | 320/2 X |
| 3,290,484 | 12/1966 | Day | 320/2 X |
| 3,391,470 | 7/1968 | Chedister | 320/2 X |
| 3,452,670 | 7/1969 | Huck et al. | 99/391 X |
| 3,513,290 | 5/1970 | Burley et al. | 320/2 X |

Primary Examiner—Walter A. Scheel
Assistant Examiner—Arthur O. Henderson
Attorney—Merchant and Gould

[57] ABSTRACT

A housing having a generally upwardly directed slot therein for receiving a slice of bread, with rechargeable battery-powered heating elements therein for toasting a slice of bread inserted within said slot.

3 Claims, 5 Drawing Figures

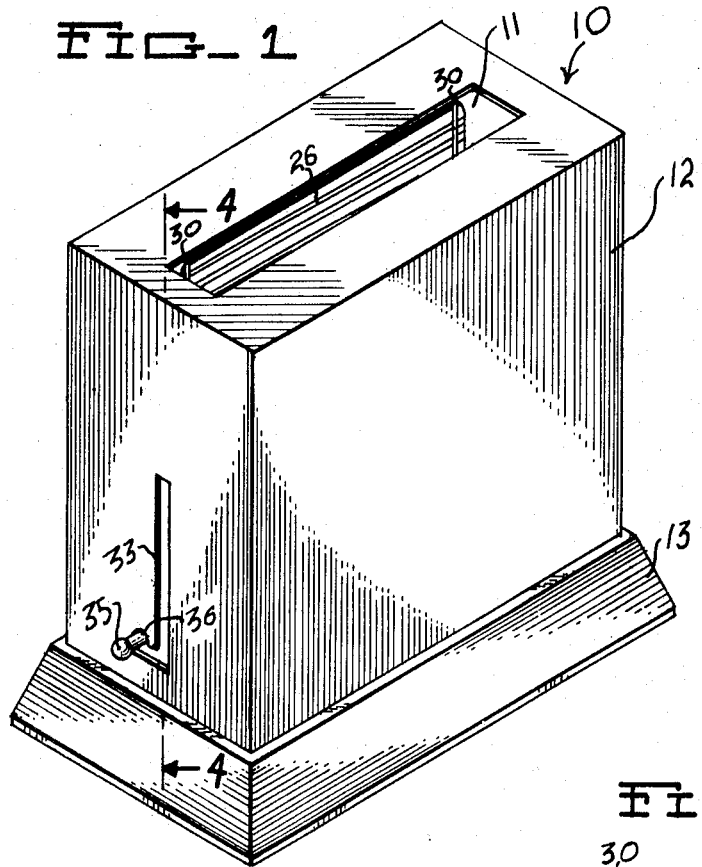
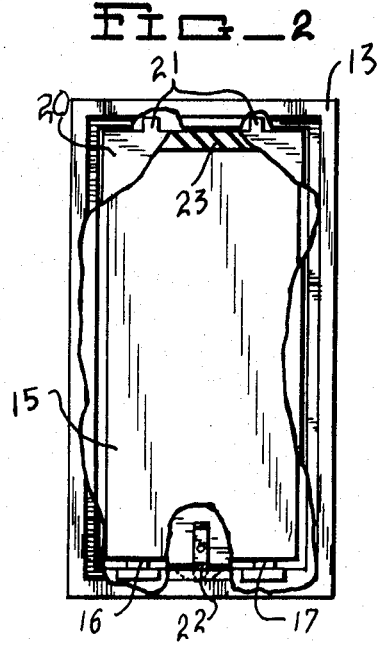
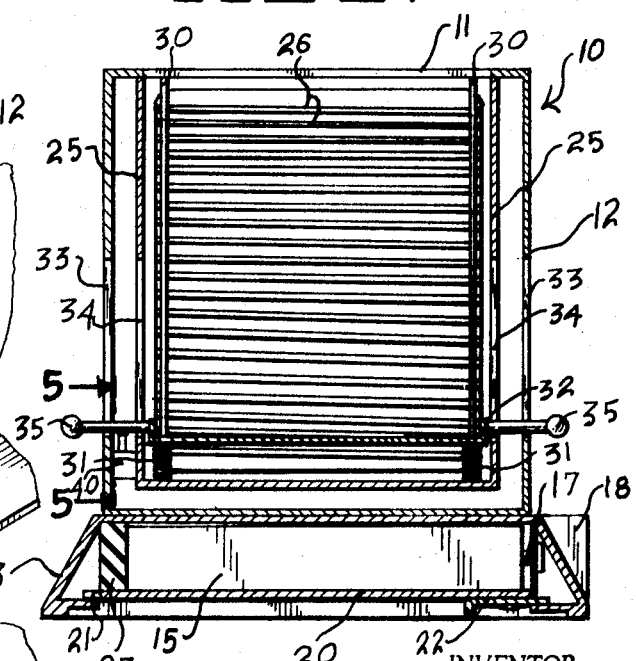
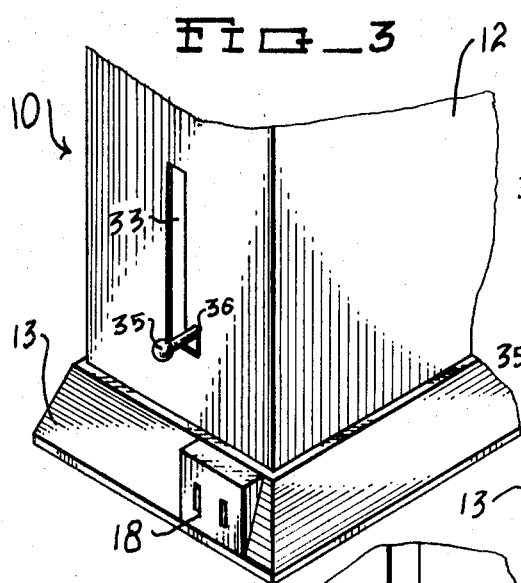
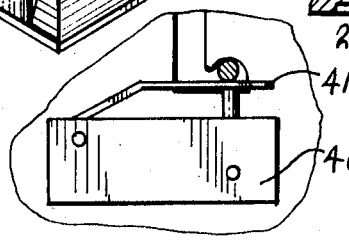

PORTABLE TOASTER

BACKGROUND OF THE INVENTION

1. Field of the Invention

In hospitals and the like where meals are served in the rooms, toast made in advance quickly becomes cold and hard. Even if the toast is maintained in a warm condition by means of steam tables or the like the toast becomes relatively cold and either hard or soggy, depending upon the method utilized to maintain it in a warm condition.

2. Description of the Prior Art

In the prior art many attempts have been made to devise apparatus for maintaining toast in a warm condition for an extended period of time. Almost without exception, these various apparatus have failed because of the peculiar characteristics of toasted bread. Consequently, until the development of the present apparatus people in hospitals and the like continued to receive relatively cold and hard or soggy toast with their meals.

SUMMARY OF THE INVENTION

The present invention pertains to a portable toaster including a housing defining an opening for receiving a slice of bread therein with heating elements mounted in the housing adjacent the opening and rechargeable batteries affixed to said heating elements through a switch, said heating elements further having plug means for rechargeably attaching the batteries to a power supply during non-use of the portable toaster.

It is an object of the present invention to provide a new and improved portable toaster.

It is a further object of the present invention to provide a portable toaster utilizing a rechargeable battery so as to be small enough to carry on a tray to the area of use.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in perspective of the portable toaster;

FIG. 2 is a view in bottom plan of the portable toaster, somewhat diminished in size, portions thereof broken away;

FIG. 3 is a view in perspective, similar to FIG. 1, illustrating the opposite end of the portable toaster, portions thereof broken away;

FIG. 4 is a sectional view as seen from the line 4—4 in FIG. 1; and

FIG. 5 is an enlarged sectional view as seen from the line 5—5 in FIG. 4.

DESCRIPTION OF THE PREFERRED EMBODIMENT

In the figures a portable toaster is illustrated having a housing generally designated 10, which housing 10 defines an upwardly directed opening 11 therein. The opening 11 is an elongated generally rectangular-shaped slot in an upwardly directed end of the housing 10, adapted to receive a slice of bread therein. In general, the dimensions of the opening 11 are slightly larger than the dimensions of a slice of commercial, presliced bread. In the present embodiment the housing 10 is formed in two portions, an upper portion 12 having a generally rectangular-shaped cross section and a base 13 affixed to a lower end of the upper portion 12, generally opposite the opening 11.

Referring to FIG. 2 it can be seen that the base 13 has a cavity therein opening downwardly and adapted to receive a rechargeable battery 15. The rechargeable battery 15 may be constructed in any desirable shape and, in the present embodiment, includes a pair of terminals 16 and 17 at one end thereof. The terminals 16 and 17 of the rechargeable battery 15 are connected to a plug 18 affixed to the base 13 at one end thereof so as to extend from the exterior thereof for ease of connection to a convenient power supply, such as 110 volts AC. The usual power supply-adapting apparatus may be contained within the cavity of the base 13, within the plug 18, or within the rechargeable battery 15 itself, whichever is the most convenient. The rechargeable battery 15 is held within the cavity of the base 13 by means of a door 20 adapted to close the cavity and having a pair of longitudinally extending ears 21 at one end thereof, adapted to pivotally fit within slots in the base 13, and a latch member 22 pivotally affixed to the other end thereof for maintaining the door 20 fixedly in position. Biasing means, which may be flexible material 23, springs, etc., is inserted in the cavity of the base 13 between an inner wall thereof and the rechargeable battery 15 to retard relative movements thereof, and to bias the battery 15 in a desired position.

The upper portion 12 of the housing 10 has insulating walls 25, which may be constructed with reflective material on the inner surfaces thereof to conserve heat and direct it inwardly toward the toast, and other convenient heat-insulating material at the outer surfaces thereof if desired. The insulating walls 25 are generally parallel with the outer walls of the housing 10 and spaced inwardly therefrom to define a slot or cavity having dimensions slightly larger than the dimensions of a slice of commercial, presliced bread. Heating elements 26 are affixed to the insulating walls 25 in a generally parallel spaced-apart relationship so that a slice of bread inserted through the opening 11 will be positioned approximately equidistant between the heating elements 26. The insulating walls 25 prevent the outer housing 10 from becoming too hot and, simultaneously, direct the heat from the heating elements 26 inwardly toward a slice of bread positioned therebetween so as to reduce the amount of power required.

A pair of elongated rods 30 are affixed to the lower horizontal portion of the insulating walls 25 so as to extend generally vertically upwardly in a spaced-apart position. Each of the rods 30 has a compression spring 31 positioned thereover and a bread-receiving platform 32, having holes adjacent either end thereof for receiving the rod 30 therethrough, is slidably engaged over the rods 30 for axial movement therealong. The compression springs 31 bias the platform 32 normally upwardly so that a slice of bread resting thereon protrudes outwardly through the opening 11 and is readily accessible. A generally vertical slot 33 is formed in the housing 10 at both vertical ends thereof and coextensive parallel slots 34 are formed in the insulating walls 25. Elongated handles 35 are affixed to the platform 32 at both ends thereof so as to extend outwardly through a slot 34 and slot 33 in the insulating walls 25 and housing 10. The slots 33 and 34, through which the handles 35 extend, serve as stops to limit the upward and downward movements of the platform 32. The lower ends of the slots 33 and 34 each have a horizontally displaced notch 36 therein adapted to receive the handles 35 at each end of the platform 32 and maintain the platform 32 in its lowermost position.

A normally open switch 40 is mounted between the housing 10 and insulating walls 25 below one of the slots 33 with an actuating arm 41 extending slightly upwardly above the lowermost extremity of the slot 33. As the platform 32 is moved downwardly into its lowermost position one of the handles 35 engages the actuating arm 41 causing the switch 40 to close. The rechargeable battery 15 is connected to the heating elements 26 through the switch 40 so that closure or operation of the switch 40 applies electrical power to the heating elements 26 from the rechargeable battery 15.

Thus, a portable toaster is described which can easily be carried to the area at which toast is to be consumed, such as at bedside in a hospital, etc., and slices of bread can be toasted as they are utilized so that the toast is always fresh and crisp. Once the meal has been completed the portable toaster can be returned to the kitchen and attached to a suitable source of electrical power, through the plug 18, so that the rechargeable battery 15 will be recharged or reenergized and prepared for the next meal at which it is to be utilized. While a preferred embodiment has been illustrated it should be understood that many modifications and, or alterations will be obvious to those skilled in the art.

What is claimed is:

1. A portable toaster comprising:
   a. a housing defining an opening therein for receiving a slice of bread;
   b. heating elements mounted generally parallel within said housing to form an elongated slot in cooperation with the opening and positioned so as to supply heat to a slice of bread within the opening for toasting the slice of bread;
   c. rechargeable battery means mounted within said housing having electrical energy storage capacity for toasting a slice of bread;
   d. plug means affixed to said housing and connected to said rechargeable battery means providing access to said battery means for the connection of an external power supply for the recharging thereof; and
   e. switch means connected to said heating elements and said rechargeable battery means for supplying electrical power to said heating elements from said battery means for toasting the slice of bread upon the operation of said switch means.

2. A portable toaster as set forth in claim 1 wherein the opening in the housing is directed upwardly and the battery means is mounted adjacent the bottom of the housing for stability thereof.

3. A portable toaster as set forth in claim 1 having in addition means for lowering into and raising out of the opening in said housing a slice of bread.

* * * * *